(No Model.)
E. C. BULL.
GAME COUNTER.
No. 570,120. Patented Oct. 27, 1896.
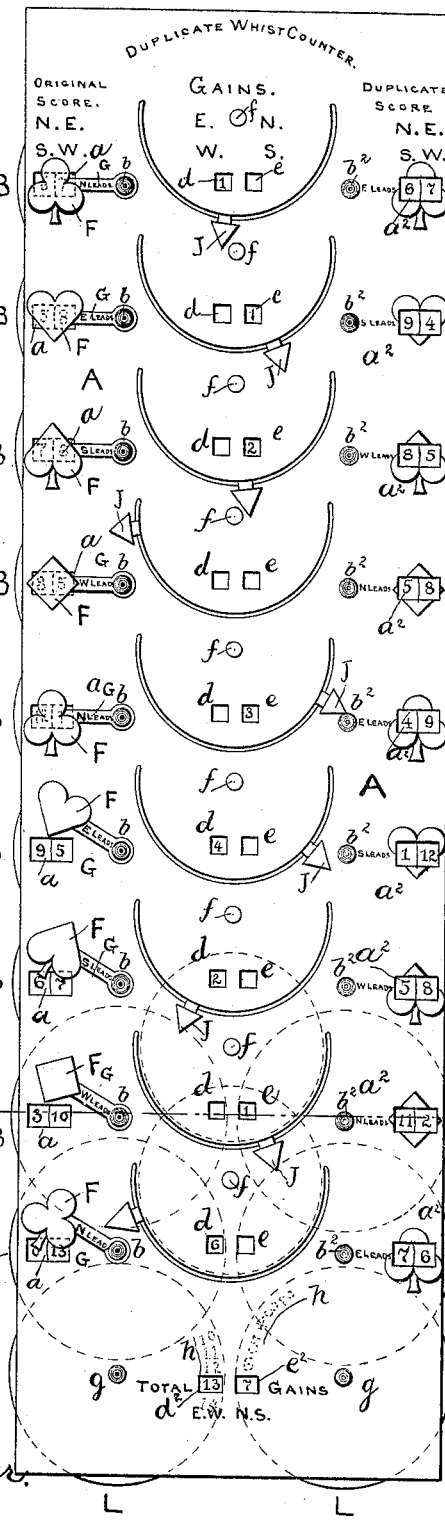
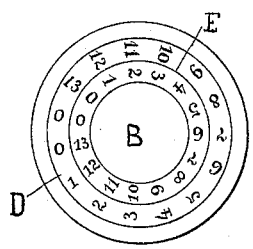
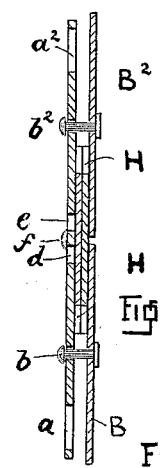
WITNESSES:
A. L. Pfaff.
Arthur Thayer.
INVENTOR,
Edward C. Bull
BY HIS ATTORNEY,
T. F. Bourne

UNITED STATES PATENT OFFICE.

EDWARD C. BULL, OF EDGEWATER, NEW YORK, ASSIGNOR TO HARCOURT BULL, OF NEW YORK, N. Y.

GAME-COUNTER.

SPECIFICATION forming part of Letters Patent No. 570,120, dated October 27, 1896.

Application filed May 5, 1894. Serial No. 510,134. (No model.)

*To all whom it may concern:*

Be it known that I, EDWARD C. BULL, a subject of the Queen of Great Britain, and a resident of the village of Edgewater, in the county of Richmond, in the State of New York, have invented certain new and useful Improvements in Game-Counters, of which the following is a specification.

My invention relates more particularly to a counter for scoring in the game of "duplicate whist," wherein I embody a series of indicators, preferably in the form of disks arranged on a plate or board in a vertical column, which indicators or disks preferably have a peculiar arrangement of numbers to indicate through openings in the plate or board the number of "tricks" taken by opposing sides in a given deal to register what is termed the "original score." A similar series of indicators or disks with corresponding apertures in the plate or board is placed preferably parallel to the first series and provided with a series of numbers, preferably peculiarly arranged, to show through the corresponding apertures in the plate or board the number of tricks taken by the opposing side, when the hands are reversed and again played to register what is termed the "duplicate score." The first series of indicators or disks, however, may have a different arrangement of single numbers thereon, in order from "0" to "13," to indicate the number of tricks taken by one given set or side of players in the original score, and in that case the second series of indicators or disks will have a corresponding arrangement of single numbers, arranged in order from "0" to "13," to indicate the number of tricks taken by the opposite set or side of players in the duplicate score. I prefer, however, the arrangement first described. Provision is also made by means of a series of indicators or disks, preferably arranged centrally between the first two-mentioned series of indicators or disks, to indicate through suitable apertures in the plate or board the number of tricks gained by either set of players and indicated in the original-score column over those gained by the opposite set of players (when in turn they play the same cards) and indicated in the duplicate-score column. In addition to the foregoing I preferably provide adjustable covers to close the apertures of the original-score column after a score has been registered, so that when the duplicate score is being played the parties will not see what score was registered in the original-score column. These covers are preferably made in the form and having the color of the "spots" or "suits" of the playing-cards, the spots for each aperture being utilized to indicate also what suit shall be used as trumps. Provision is also made, by means of spots having form and color of the suits of the cards surrounding the duplicate-score apertures and being the same spots as are on the covers of the corresponding original-score apertures, for indicating what suit shall be used as "trumps" when playing said duplicate score. (Provision is also made for indicating what player is to lead during each deal.) I may also provide a pair of disks that are located at the lower part of the plate or board, which latter is provided with apertures to permit figures on said disks to appear, which disks will be utilized to indicate the total number of points gained by either side throughout a series of deals, being the sum of the respective gains that are registered in the respective central apertures above them.

My invention also consists in the novel details of improvement and the combinations of parts that will be more fully hereinafter set forth, and then pointed out in the claims.

Reference is to be had to the accompanying drawings, forming part hereof, wherein—

Figure 1 is a face view of my improved game-counter complete. Fig. 2 is a face view of one of the disks for the original-score column, showing the preferred arrangement of the double figures thereon. Fig. 3 is a similar view of one of the disks for the duplicate-score column. Fig. 4 is a detail view of one of the disks for registering the gains one set of players makes over the other in a given deal, when the hands are reversed and again played. Fig. 5 is a cross-section on the line $y\,y$ in Fig. 1. Fig. 6 is a detail sectional view showing a modified arrangement for holding the disks upon the plate or board, and Fig. 7 is a detail view of a disk having a single row of figures.

Referring now to the accompanying drawings, wherein similar letters of reference indicate corresponding parts in the several views, the letter A indicates a plate or board which may be made of any desired material, such as leather, pasteboard, celluloid, metal, &c., which is preferably in the form of an oblong rectangle, as shown in Fig. 1. The plate A is provided near one edge with a series of apertures $a$, arranged in a column beneath the designation "Original score." Suitable designations are also provided on the plate A, above the column of apertures $a$, to indicate the positions of the players at the table, such as "E W" and "N S," as shown in Fig. 1. When the disks have the arrangement of figures secondly described above, as in Fig. 7, the designation "N S" would preferably be used alone over the left-hand column of apertures $a$ and the designation "E W" alone over the right-hand column of apertures $a^2$.

B are indicators, shown in the form of a series of disks, pivotally carried by the plate or board A, as by pivots $b$, and having one edge projecting slightly beyond the edge of the plate A, a portion of which disks B may be seen through the corresponding apertures $a$ in said plate.

The disks B are preferably provided with a peculiar arrangement of figures to indicate the number of tricks taken by each set of players or side in a deal, the arrangement of figures for this purpose being clearly shown in Fig. 2. Preferably two sets of figures are arranged on a line on the disk B, that radiate from the pivotal point of said disk, the figures being so arranged that they will show through the openings in the plate A in the proper reading order as the disks are turned. Thus it will be seen that the disks B have an outer circle of figures D, there being two "0's," and then the numbers running regularly from "1" to "13," as well as a corresponding inner row of similar figures, but differently disposed, that is to say, the two ciphers are opposite each other, and then the cipher of one circular row of figures is on a line with the "13" of the other row of figures and the "1" of one row of figures is in a line with the "12" of the other row, and so on throughout the series of figures, the arrangement being such that the two figures on a line added together always equal "13."

Between the rows of figures D is a circular line E, which serves to separate the figures of each row, when seen through the apertures $a$ in the plate A, into individual registering-numbers which lie directly under the designations "N S" and "E W," so that the numbers appearing in the apertures $a$ will indicate the exact number of tricks taken by each "side." Thus suppose a deal was played and "N S" won eight tricks and "E W" won five tricks, the disk B, corresponding to the deal then played, would be turned until the figure "8" appeared under "N S" on the plate A and the figure "5" under "E W," whereupon the score for that deal would be registered. The same manner of scoring would be pursued for each deal played in the original score.

In order to prevent the scores in the original-score column from being seen when the duplicate deals are being played, I provide covers F, the main parts of which are preferably in the form and color of the spots on the cards, as shown, and these spots indicate the trump to be played in the original deal. The covers or spots F are shown carried by arms G, that are pivoted on the plate or board A by pivots $b$, so that said covers can be moved to cover or uncover the apertures or openings $a$, as shown.

On the opposite side of the plate A are a series of apertures $a^2$, arranged in a vertical column under the designation "Duplicate score," substantially similar and corresponding to the column under "Original score." The designations "N S" and "E W," to indicate the set of players, are also placed on the plate A above the apertures $a^2$. $B^2$ are a series of disks pivoted on the plate at $b^2$ and preferably having figures $D^2$ arranged in circular rows, as shown in Fig. 3. The figures $D^2$ are also arranged in line like those on disks B, with a dividing-line $E^2$ to separate said figures into two columns, the arrangement of the figures $D^2$ to add up "13" on each line being like those on disks B, excepting that the reading positions of the figures are on the right-hand side of the disks $B^2$ and on the left-hand side of the disks B. The figures are arranged in this manner so that the disks B and $B^2$ can be substantially hidden by the plate A, and yet their figures can appear through the apertures near the sides of the plate A. The outer edges of the disks B and $B^2$ are shown projecting from the sides of the plate A in position to be turned by the fingers of the player.

Near the longitudinal center of the plate or board A are two vertical columns of apertures $d$ and $e$, beneath a designation "Gains," the left-hand column having over it the letters "E W" and the right-hand column having over it the letters "N S" or other players' designations. H are a series of disks pivoted on the plate or board A, as at $f$, and located behind the apertures $d\ e$, as shown in dotted lines. The disks H have figures I, preferably arranged in groups of two figures, as shown in Fig. 4, the figures I running as high in value as will be necessary to indicate the number of tricks gained by one set of players or side over the other, when the hands are reversed and the deal played again, six figures being shown on the disk H in Fig. 4. The figures I on the disks H are shown arranged in groups of two, with a space $I^2$ between them, the arrangement being such that only one figure at a time will show through an opening $d$ or $e$ in the plate A, as in Fig. 1.

The disks H are shown provided with projecting finger-pieces J, that pass through curved slots K in the plate or board A, whereby the disks H can be readily turned. The arrangement and use of the above-described parts are such that when a deal has been played the number of tricks taken by each side is registered by the disk B behind the appropriate opening $a$ in the original-score column, and so on for the number of original games played. The covers F are placed over the openings $a$ after each deal is scored to conceal the scores. The first duplicate deal is then played with the same trump as the opposite original deal but with different lead, and the score is registered behind opening $a^2$. The two scores are then compared, and the side which has gained the greater number of tricks with the same hands, which is at once evident on a comparison of the figures under the designation "E W" in the opening $a$ with the figures under the designation "N S" in the opening $a^2$, turns the disk H to register the number of tricks so gained in the aperture $d$ or $e$, according to the designation "E W" or "N S" above said apertures, and so on with all the duplicate deals. It will be observed that the apertures $a$, $d$, $e$, or $a^2$ are on a line, so that the scoring for the corresponding original and duplicate deals can be compared at a glance and the games registered without liability to error.

When it is desired to register the total number of tricks gained for a given series of deals, I provide a pair of apertures $d^2$ and $e^2$ beneath the column of apertures $d$ and $e$, and on the plate A behind said apertures I pivot disks L, as at $g$, which disks L each have a circular row of figures $h$ to show through the apertures $d^2$ or $e^2$ to indicate, when properly turned, the total gains made by each side of players, respectively, during the whole series of deals, being the sum of the games registered in the columns $d$ and $e$, respectively. The figures $h$ may run as high in value as found necessary.

In Fig. 5 is illustrated in section the arrangement of the disks B, H, and B$^2$, wherein for economy of space the disks B and B$^2$ are on a line, while the disks H overlap the disks B and B$^2$ or break joints therewith.

For the purpose of conveniently turning the disk H, I may attach to said disk a rotative pivot $b^3$, that turns in an aperture $b^4$ in plate A and has a finger-knot $b^5$, by which it can be turned, the disk being suitably secured to said pivot, as in Fig. 6. The pivot $b^3$ may also carry a projection $b^6$ to hold it in place on the plate A and to allow free manipulation of the pivot and disk.

The several disks may be pivoted on the plate or board by suitable means. Around the apertures $a^2$ I preferably print the spots to indicate what trumps are to be played in the duplicate score, which trumps will always be the same as that shown on the cover of the corresponding original-score apertures. I also, preferably, print the words "N leads," "E leads," "S leads," "W leads," and so on in that order throughout on the covers of the apertures $a$, and opposite to the apertures $a^2$, to indicate which player leads in the play of each deal; and I also, preferably, print the words "Total gains N S—E W" at the bottom of the plate A on either side and under the aperture $d^2\ e^2$ to show the total gains made by the two sets of players, respectively.

My device will be found very useful in scoring in duplicate whist when one side in the duplicate score plays with the cards or "hands" previously used by their opponents in the original score, as both scores are thus retained or registered, as well as the difference or gains one side made over the other, if any.

The device is simple in construction and readily operated. It will be understood that I do not limit myself to the number of deals shown, nor to the arrangement of the trumps or spots on the plate or covers, nor to the designating letters or words indicated in the drawings, as any desired designations may be used, as found most suitable, and as the board may be made to register any desired number of original and duplicate deals.

When in this specification I say "disks," I mean, of course, indicators capable of performing the functions ascribed to the disks.

Having now described my invention, what I claim is—

1. A game-counter consisting of a plate or board having therein four or more horizontal series of apertures, each series having four apertures each, combined with means carried by said plate or board for causing numbers to appear in or through said apertures, and designations consisting of words and letters at the top end of said plate or board to indicate that two apertures in each series are for scores made in play, and other designations, consisting of words and letters, likewise at the top end of said plate or board to indicate that the other two apertures in each series are for registering the difference between said scores, substantially as described.

2. A game-counter consisting of a plate or board having therein four or more horizontal series of apertures each series having four apertures, and means carried by said plate or board for causing figures to appear in or through said apertures, said means comprising separate indicators for each of two apertures in each series, each separate indicator showing figures behind or through each of said apertures respectively, and a single indicator for the other two apertures in each series, said single indicator being so arranged as to show figures behind or through either one or the other of said apertures but not behind or through both at the same time, substantially as described.

3. A game-counter comprising a plate or board having a column of apertures and a series of disks to appear through said apertures, said disks having two circular rows of oppositely-disposed figures, each row of figures being equal in value to indicate at once the number of tricks taken by each of two opposing sides respectively, substantially as set forth.

4. A game-counter comprising a plate or board having an aperture therein, an indicator carried behind said aperture and having figures thereon to appear in or through said aperture, said plate or board having also two other apertures in line or series with said first-mentioned aperture, and an indicator carried behind both of said two last-mentioned apertures and having figures thereon so arranged that each digit may appear in or through either of said two last-mentioned apertures but that when a digit appears in reading position in one of said last-mentioned apertures no digit so appears in the other of said last-mentioned apertures, substantially as described.

5. A game-counter comprising a plate or board having slots K, and two parallel columns of apertures $d$, $e$, and rotative disks to appear through said apertures, said disks having fingers or pointers to pass through the slots K, said disks also having figures arranged to appear one at a time through either of the openings $d$ or $e$, substantially as described.

6. A game-counter comprising a plate or board having two parallel columns of apertures near opposite sides, rotative disks having figures to appear through said apertures, said plate or board also having two parallel columns of apertures located between the first-mentioned apertures and a series of disks having figures to appear through only one of said central apertures at a time, said figures being arranged to indicate the difference in value shown by the first-mentioned disks, substantially as set forth.

7. In a game-counter, the combination of a plate or board having apertures, appropriate means for causing figures or significations to appear through said apertures and covers for said apertures carried by arms that are pivoted to said plate or board, to cover said apertures, substantially as described.

8. In a game-counter, the combination of a plate or board having two apertures $d$ and $e$ and an indicator or disk H carried behind both of said apertures, said indicator or disk having figures thereon so arranged that when a digit appears in reading position behind or through one of said apertures no digit so appears behind or through the other of said apertures, said plate or board also having two apertures $d^2$ and $e^2$ and indicators or disks L carried behind said apertures, with figures thereon to appear through said apertures $d^2$ and $e^2$, substantially as and for the purposes specified.

9. A game-counter comprising a plate or board having two parallel columns of apertures, rotative disks having figures to appear through said apertures, said plate or board also having two other parallel columns of apertures and series of disks having figures arranged to appear through said apertures, said figures being arranged to indicate the difference in value shown by the first-mentioned disks, substantially as described.

10. A game-counter consisting of a plate or board having therein one or more series of apertures combined with means carried by said plate or board for causing numbers to appear in or through said apertures said means consisting of a single indicator, with figures thereon arranged to show through either one of two apertures in each series, and other indicators, with figures thereon arranged to show through one only of each other aperture in each series, and designations consisting of letters and words on said plate or board adjacent to said apertures to indicate that two of the apertures in each series are for the purpose of registering gains or differences in the tricks taken by different sets of players and that the other apertures in said series are for the purpose of registering the tricks made or to be made in actual play by one or the other of said sets of players as a basis of comparison, substantially as described.

EDWARD C. BULL.

Witnesses:
GEO. P. ANDROM,
HARCOURT BULL.